(12) United States Patent
Katis et al.

(10) Patent No.: US 8,983,560 B2
(45) Date of Patent: *Mar. 17, 2015

(54) SMART CASE FOR MOBILE COMMUNICATION DEVICES

(71) Applicant: Voxer IP LLC, San Francisco, CA (US)

(72) Inventors: Thomas E. Katis, Jackson, WY (US); Igal Perelman, Oakland, CA (US)

(73) Assignee: Voxer IP LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,995

(22) Filed: Apr. 7, 2014

(65) Prior Publication Data
US 2014/0221057 A1 Aug. 7, 2014

Related U.S. Application Data

(63) Continuation of application No. 13/485,608, filed on May 31, 2012, now Pat. No. 8,718,728.

(51) Int. Cl.
| | |
|---|---|
| *H04M 1/00* | (2006.01) |
| *H04W 4/16* | (2009.01) |
| *H04W 4/00* | (2009.01) |
| *H04W 4/10* | (2009.01) |
| *H04W 88/06* | (2009.01) |
| *H04B 1/38* | (2006.01) |
| *H04W 76/00* | (2009.01) |

(52) U.S. Cl.
CPC ............... *H04B 1/3888* (2013.01); *H04W 4/16* (2013.01); *H04W 4/001* (2013.01); *H04W 4/10* (2013.01); *H04W 88/06* (2013.01); *H04W 76/005* (2013.01)
USPC ........................................ 455/575.8; 455/90.2

(58) Field of Classification Search
CPC ........................... H04B 1/3888; H04M 1/0283
USPC ................. 455/90.2, 90.3, 556.1, 556.2, 557, 455/569.1, 569.2, 575.1, 575.8
See application file for complete search history.

(56) References Cited

U.S. PATENT DOCUMENTS

| | | | |
|---|---|---|---|
| 5,418,836 A | 5/1995 | Yazaki | |
| 8,718,728 B2 * | 5/2014 | Katis et al. | ................. 455/575.8 |
| 2002/0133659 A1 | 9/2002 | Tree et al. | |
| 2004/0203510 A1 * | 10/2004 | Claxton et al. | ............... 455/90.3 |
| 2006/0014540 A1 * | 1/2006 | Klein et al. | .................... 455/445 |
| 2009/0312058 A9 | 12/2009 | Wood et al. | |

* cited by examiner

*Primary Examiner* — Lee Nguyen
(74) *Attorney, Agent, or Firm* — Beyer Law Group LLP (57) ABSTRACT

A smart case configured to encapsulate a mobile communication device. The smart case includes a radio embedded in the case for selectively enabling the encapsulated mobile communication device to communicate over a wireless network using either the radio embedded in the case or the Wi-Fi and/or cellular radio in the communication device itself. In alternative embodiments, either a hard switch, a soft switch, or both, is provided for switching between either the radios(s) embedded in the smart case or the internal radio(s) in the mobile communication device.

23 Claims, 10 Drawing Sheets

SMART CASE FOR MOBILE COMMUNICATION DEVICES

CROSS-REFERENCE TO RELATED APPLICATIONS

This application is a continuation of pending U.S. application Ser. No. 13/485,608, filed on May 31, 2012 and entitled "SMART CASE FOR MOBILE COMMUNICATION DEVICES," which is incorporated herein by reference in its entirety for all purposes.

BACKGROUND

1. Field of the Invention

The present invention relates to mobile communications, and more particularly, to a smart case that provides additional functionality and features for mobile communication devices, such as smart phones and/or tablet devices.

2. Description of Related Art

In recent years, mobile communications and computing has become extremely popular. More and more people are using mobile communication devices, such as smart phones and tablets, for a variety of reasons. In addition to conventional mobile telephony, individuals also use mobile communication devices for emailing, accessing the Internet, reading e-books and other electronic peripherals, engaging in social networking, playing video games, etc. With the proliferation of more and more mobile applications, the trend of increased usage of mobile communication devices is likely to continue.

With increased usage, mobile communication devices are typically subject to a significant amount of wear and tear. Many users are constantly handling their mobile communication devices, repeatedly retrieving, using, and storing their device into pockets, purses, briefcases, etc. As a result, the devices are often subject to damage, for example, the scratching of the body of the device, or worse, cracked or broken display screens from accidental droppage.

The use of protective covers has become very popular as a way to protect mobile communication devices. These protective covers are designed to encapsulate the mobile communication device with a protective layer of plastic and/or rubber. Although such covers are adequate for protecting mobile communication devices from physical harm, they typically do not provide any features or perform any functions to enhance or complement the operation of the mobile communication device.

SUMMARY OF THE INVENTION

The present invention relates to a smart case configured to encapsulate a mobile communication device. The smart case includes a radio embedded in the case for selectively enabling the encapsulated mobile communication device to communicate over a wireless network using either the radio embedded in the case or the Wi-Fi and/or cellular radio in the communication device itself. In alternative embodiments, either a hard switch, a soft switch, or both, is provided for switching between either the radios(s) embedded in the smart case or the internal radio(s) in the mobile communication device. With hard switch embodiments, a user of the communication device can manually switch between radios. With soft switch embodiments, the switch may occur manually using a software switch appearing on a display screen of the communication device or automatically when a predetermined condition or event occurs.

In various further embodiments, the case may include a Push-To-Talk button that enhances or enables the mobile communication device to operate as a PTT communication device, one or more scrolling wheels, inputs, memory card interfaces, SIM card interfaces, a still and/or video camera lens, game controller and/or a battery.

In one non-exclusive embodiment, the mobile communication device is a consumer communication device and the radio embedded in the case is a tactical radio that enables the consumer communication device to operate on a tactical radio network. In non-exclusive examples, the mobile communication device is either a cellular phone, mobile phone or tablet computer and the tactical radio network may be a military, police, satellite, first responder, police, fire-fighter, or any other tactical communication network.

BRIEF DESCRIPTION OF THE DRAWINGS

The invention may best be understood by reference to the following description taken in conjunction with the accompanying drawings, which illustrate specific embodiments of the invention.

It should be noted that like reference numbers refer to like elements in the figures.

The above-listed figures are illustrative and are provided as merely examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

Figure 1A:
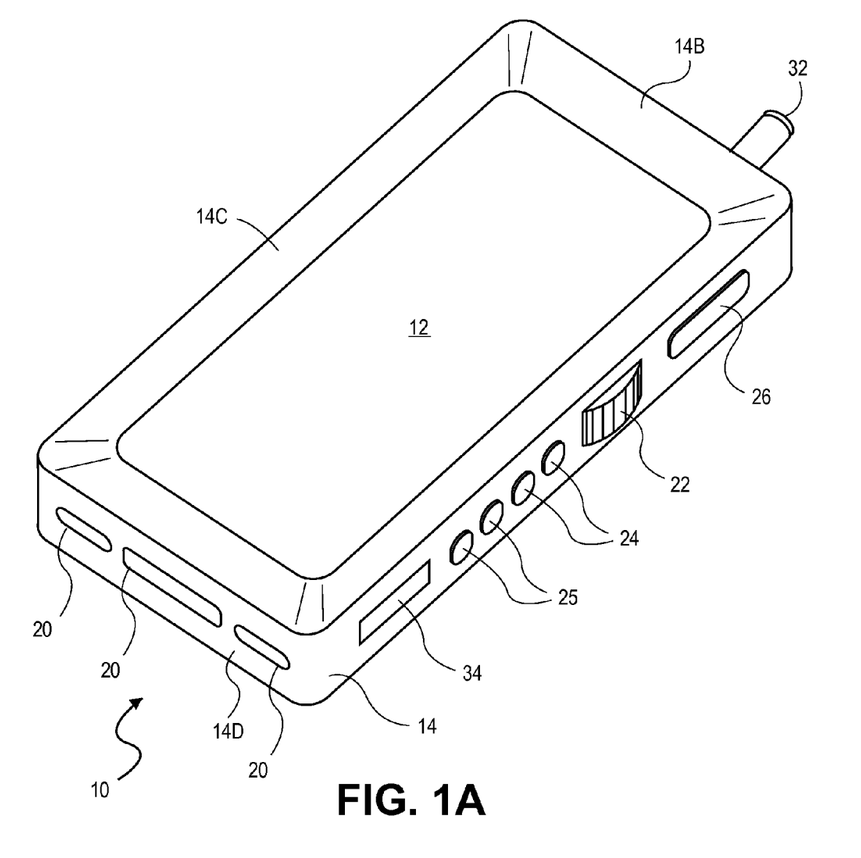
FIGS. 1A, 1B and 1C are diagrams of an exemplary smart case for mobile communication devices embodying the principles of the present invention.
Figure 1B:
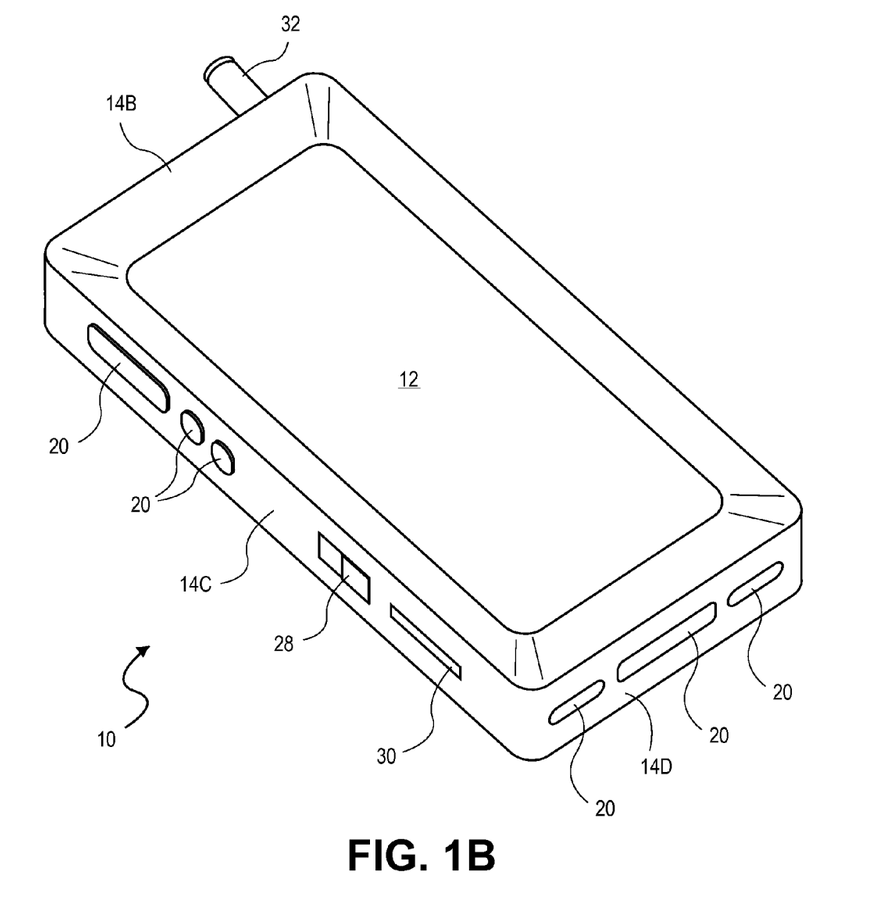
Figure 1C:
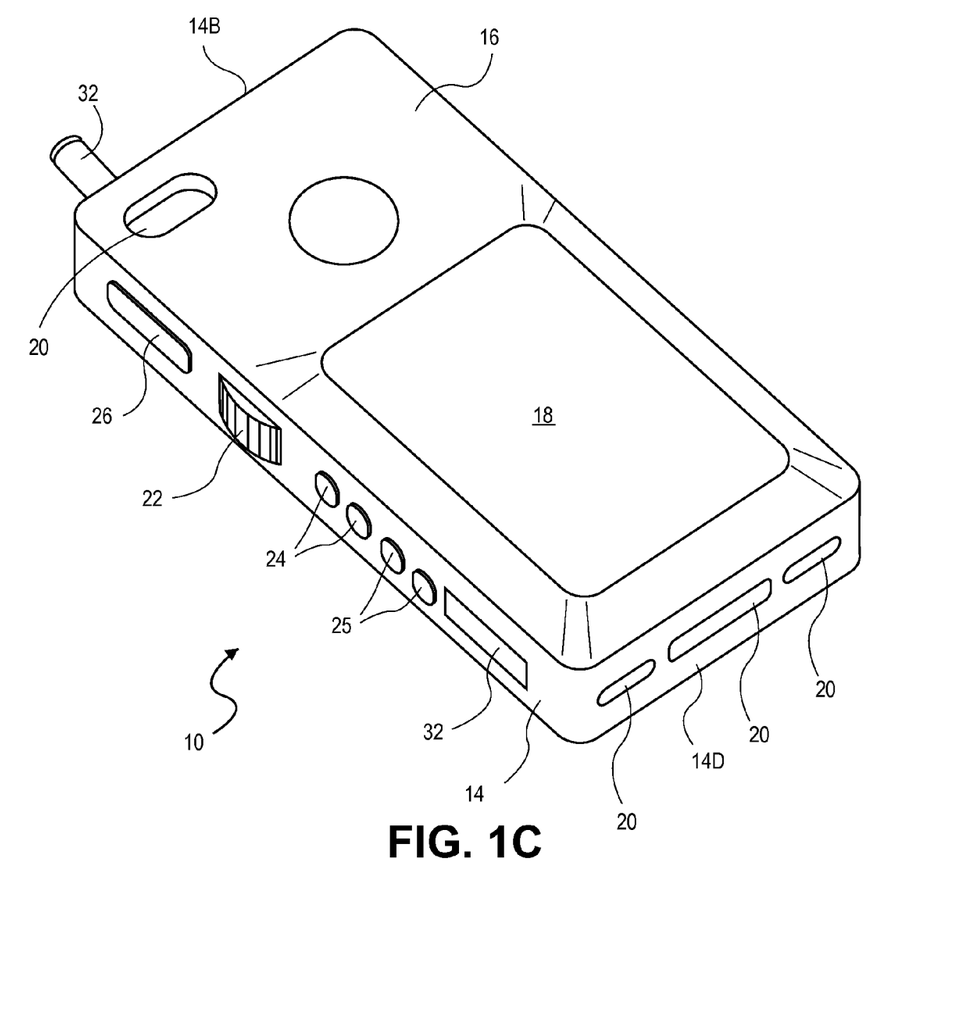

Referring to FIGS. 1A, 1B and 1C, diagrams of a non-exclusive embodiment of a smart case 10 embodying the principles of the present invention is shown. In this example, the smart case 10 is designed specifically for an iPhone 4S by Apple of Cupertino, Calif. It should be understood, however, that the reference to an iPhone is solely for illustrative purposes. The smart case 10, as described herein, is intended to be used in cooperation with any mobile communication device, including any mobile phone or tablet, regardless of the operating system, manufacturer or model. Consequently, the specific configuration of the smart case 10, as described and illustrated herein, should not be construed as limiting in any regard. Rather, the smart case 10 can be configured and shaped for any mobile phone or tablet.

In the non-exclusive embodiment shown, the smart case 10 includes a cavity 12 defined by four peripheral side walls 14D-14D and a back wall 16. When a mobile communication device (not illustrated) is inserted within the cavity 12 of the smart case 10, the back and four sides of the communication device are protected, while the touch-sensitive display screen is visible and accessible. The back wall 16 further includes a region 18, which is provided to internally house circuitry and other electronic components within the smart case 10, as later described in more detail. Various recess regions 20 are also provided within the smart case 10 to provide access to features on the mobile communication device itself, such as volume control, a vibrate on/off switch, a microphone, speaker(s), a dock connector, headset jack, or an opening for a camera lens. The case 10 is preferably made of a hardened and/or compliant material, such as plastic and/or rubber, which provides protection for the mobile communication device when encapsulated within the cavity 12.

The smart case 10 further includes a number of elements that perform various functions that enhance, complement and/or provide additional functionality and/or services for the mobile communication device 10. These elements include one or more scrolling wheels 22, one or more input buttons 24, one or more up/down buttons 25, a Push-To-Talk (PTT) button 26, a still and/or video camera lens 27, one or more radio selector switches 28, one or more video game controller features 29, one or more SIM card interfaces 30, an antenna 32, one or more memory card interfaces 34. Again, the location and number of elements 22 through 38 as illustrated are merely exemplary. It should be understood that the use, number and location of each of these elements may vary, depending on the type of communication device intended to be housed within the smart case 10.

Figure 2:
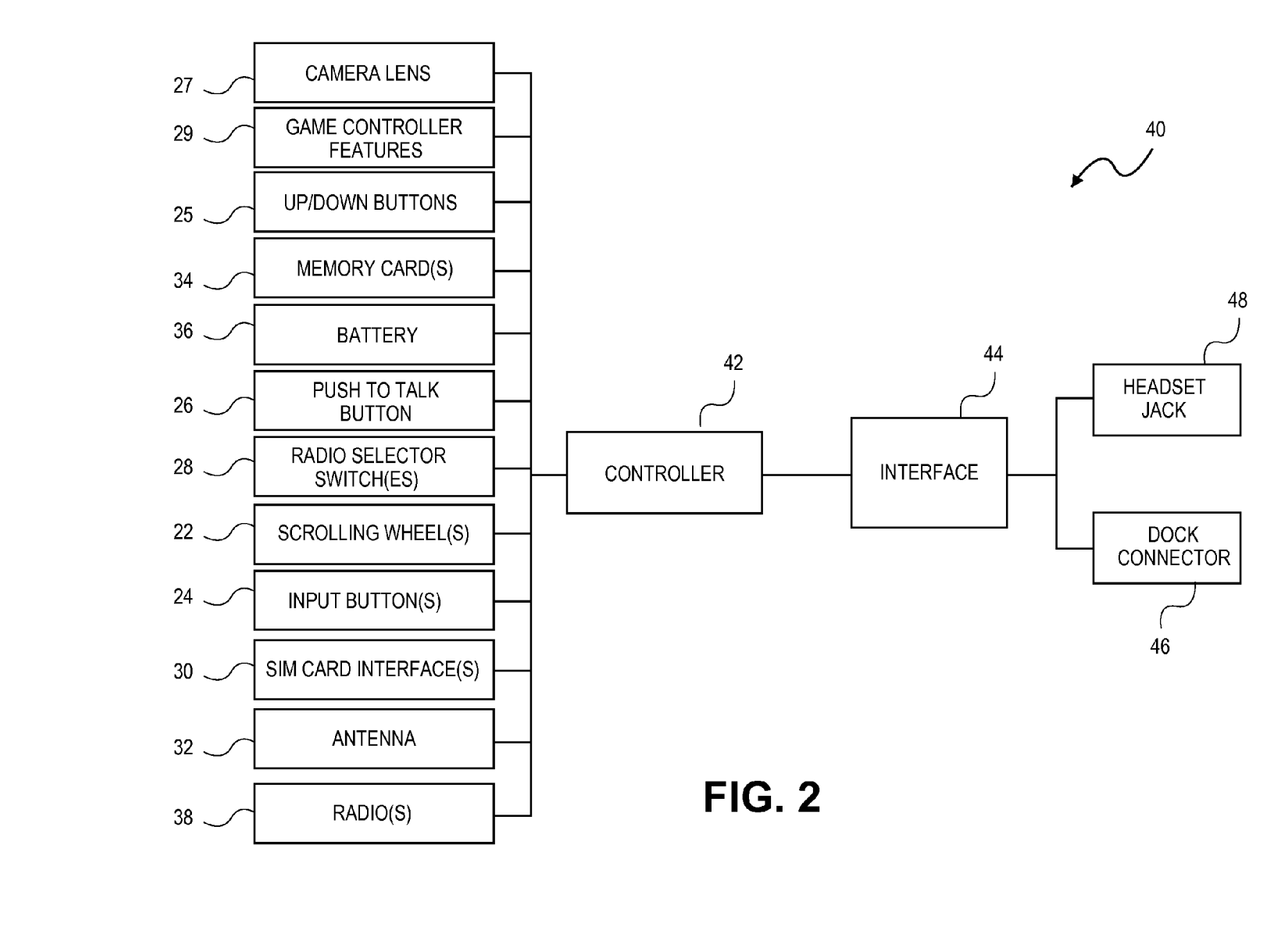
FIG. 2 is a block diagram of a non-exclusive embodiment of the circuitry contained in the smart case of the present invention.

Referring to FIG. 2, a block diagram of a non-exclusive embodiment of the circuitry 40 contained in the smart case 10 in accordance with the principles of the present invention is shown. The circuitry 40 includes a controller 42, which is coupled to the one or more scrolling wheels 22, the one or more input buttons 24, the one or more up/down buttons 25, the Push-To-Talk (PTT) button 26, the camera lens 27, the one or more radio selector switch(es) 28, the video game controller features 29, the one or more SIM card interface(s) 30, the antenna 32, the memory card interface(s) 34, a rechargeable battery 36 and one or more radio(s) 38 embedded within the smart case 10. The controller 42 communicates with the internal circuitry of the mobile communication device through interface circuitry 44 connected to the dock connector 46 and/or headset jack 48 on the mobile communication device.

The battery 36 is optionally provided as a back-up power supply for the battery internal to the mobile communication device. As power from the internal battery becomes low, the power supply can be switched to the battery 36. Similarly, the battery 36 may be recharged when the internal battery on the mobile communication device is recharged.

The one or more radio(s) 38 embedded into the smart case 10 may include any wireless radio, including, but not limited to Wi-Fi, GSM, CDMA, LTE, or any other wireless communication radio used on or by data communication networks, cellular communication networks, satellite communication networks, military radio communication networks, or first responder radio communication networks (e.g., fire and police). With one or more radio(s) 38, the smart case 10 enables the communication device to communicate over multiple wireless networks, potentially some of which the device 10 was not originally intended to operate.

The radio selector switch(es) 28 enable a user of a consumer orientated communication device, such as an cell phones or tablet computers, to switch between different radios. For example, when a switch 28 is in a first position, the internal Wi-Fi radio and/or cellular radio (e.g., GSM or CDMA) of the communication device 10 are used, while an external radio built into the smart case 10 is used when the switch 28 is in a second position.

The SIM card interface(s) 30 enable different SIM cards to be inserted into the smart case 10.

The antenna 32 is selectively designed to operate in cooperation with either the internal radio(s) on the communication device, the radio(s) 38 embedded in the smart case 10, or a combination of both radios. In either case, the antenna 32 preferably extends the range of operation beyond the capabilities of the internal antenna provided on the communication device. Although the antenna in the figures is shown as protruding from the smart case 10, it should be understood that any type of antenna design may be used, including an antenna embedded within the smart case 10, or a telescoping antenna.

The memory card interface(s) 34 enable the insertion of one or more memory cards into the smart case 10. The memory cards may be selectively used to increase the storage capacity of the internal memory contained within the communication device.

The camera lens 27, in various embodiments, may be either a still camera lens or a video camera lens, or both. Consumer mobile communication devices, such as an iPhone, already include a still and/or video camera lens. These lenses, however, are typically of relatively poor quality. By incorporating a higher quality lens in the smart case 10, a user can benefit from higher quality optics when using their communication device for shooting photos or video.

The video game controller features 29 embedded in the smart case 10 enables or enhances the ability to use a mobile communication device as a mobile game playing device. In various embodiments, the smart case 10 may include joy sticks, tactile controllers, input buttons, control buttons, etc.

In co-pending, commonly assigned, U.S. application Ser. No. 12/037,749, entitled Telecommunication and Multimedia Management Method and Case, incorporated by reference herein for all purposes, a PTT communication application for both mobile and non-mobile communication devices is described. This PTT communication application, commercially distributed by the assignee of the present application as Voxer® Walkie Talkie, is designed to operate on certain mobile communication devices, such as iOS mobile phones and tablets from Apple of Cupertino, Calif. and similar devices designed for the Android operating system from Google, Mountain View, Calif. Although these devices include a wide variety of features to enhance voice, video and text based communication, they are not optimized for PTT type communication applications, such as Voxer®. The smart case 10 can be used to enhance the functionality and operation of mobile communication devices using Voxer®, as described below with respect to FIGS. 3 through 5.

Figure 3:
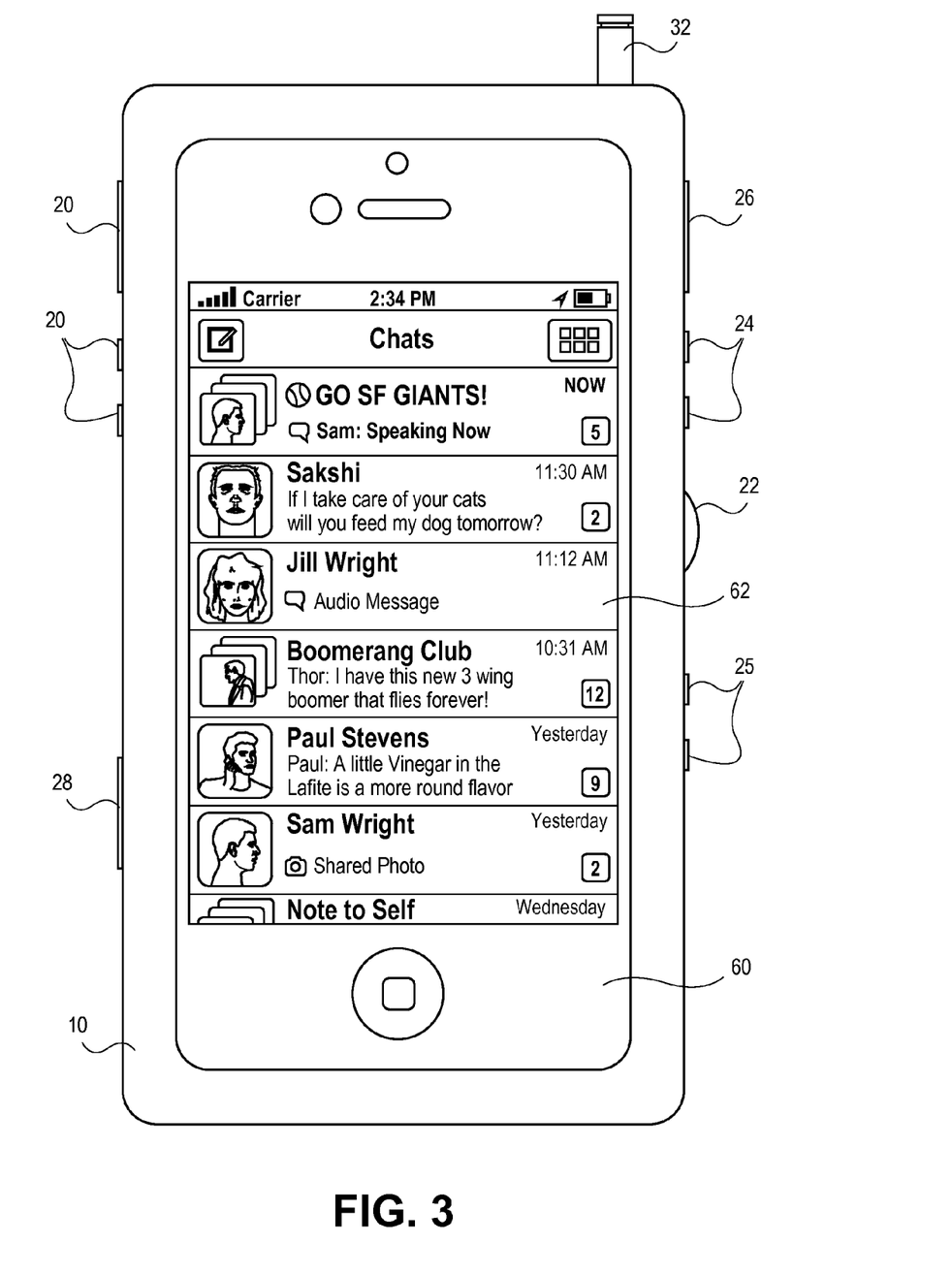
FIG. 3 is a diagram of the smart case used in cooperation with a mobile communication device in accordance with the principles of the present invention.

FIG. 3 is a diagram of a mobile communication device 60 encapsulated within a smart case 10. A touch screen 62 of the mobile communication device 60 is visible and accessible within the cavity 12 of the case 10. When the Voxer® application is launched, the active conversations of the user of the communication device 60 appears on the touch screen 62. In this example, the conversations include group "Chats" entitled "GO SF GIANTS" and the "Boomerang Club", as well as other chats with individuals named Sakshi, Jill Wright, Paul Stevens and Sam Wright. Ordinarily with Voxer, a conversation is selected for participation by touching the screen 62. With the smart case 10, however, a conversation may also be selected by using scrolling wheel 22 or up/down buttons 25. By scrolling the wheel 22, or using the up/down buttons 25, individual conversations are highlighted on screen 62. When a desired conversation is reached, one of the input buttons 24 is used to select the conversation.

Figure 4:
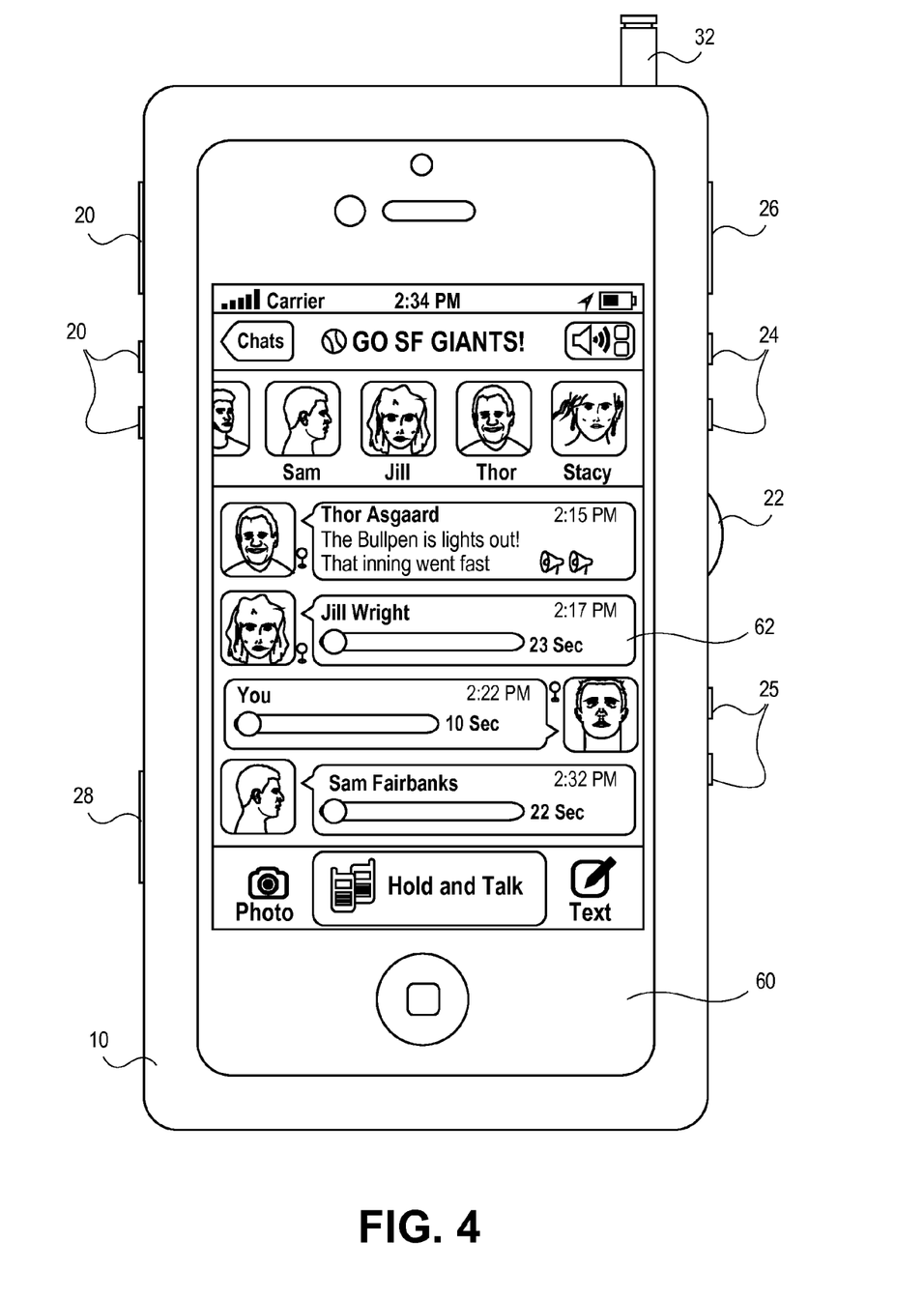
FIG. 4 is another diagram of the smart case used in cooperation with a mobile communication device in accordance with the principles of the present invention.

In FIG. 4, the touch screen 62 shows the conversation history of the GO SF GIANTS chat after the conversation has been selected. As illustrated, the conversation includes the participants (e.g. Sam, Jill, Thor and Stacy) and media bubbles representing the media contributions of the participants. The media contributions may include voice messages, text messages, video, or photos. With the Voxer application, one can scroll up and down the conversation history by dragging a finger either upward or downward across the touch screen 62 and an individual message may be selected using a finger to touch the corresponding media bubble. Alternatively, with the smart case 10, the scrolling wheel 22, or the up/down buttons 25, can be using to scroll up and down through the conversation history and individual messages can be selected for review using an input button 24.

Figure 5:
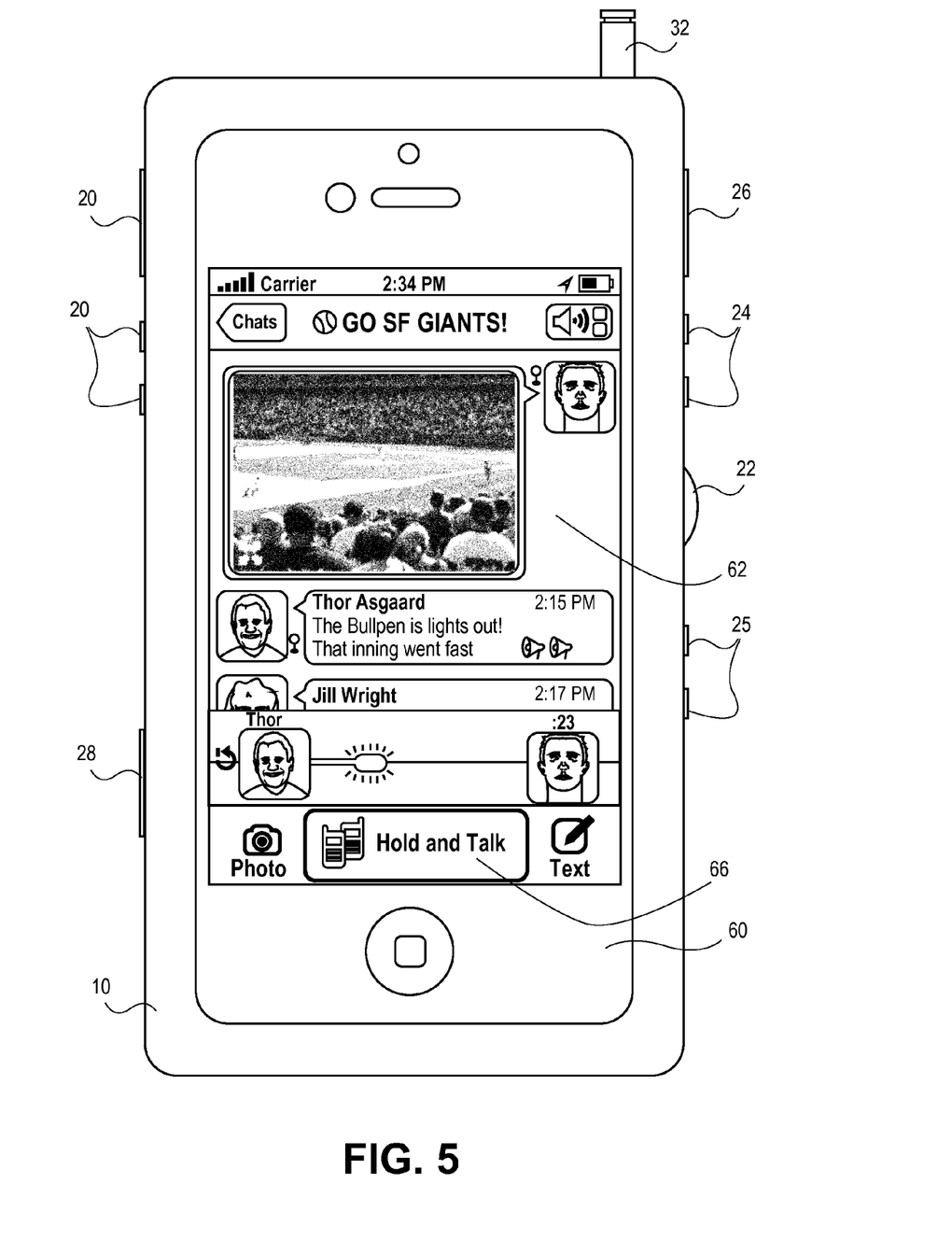
FIG. 5 is yet another diagram of the smart case used in cooperation with a mobile communication device in accordance with the principles of the present invention.

In FIG. 5, the creation of a voice message using the Voxer application is illustrated. A voice message is typically created by contacting the "Hold and Talk" button 66 on the display screen 62, for the duration of the message, as the user speaks into the microphone of the communication device 60. With the smart case 10, the message can alternatively be created by holding the PTT button 26, while the user speaks into the microphone. In either case, the message is progressively streamed out to the participants of the conversation, as the message is created.

The above example illustrates the smart case 10, operating in cooperation with Voxer, for consumer applications. The radio(s) 38 and the one or more switches 28 embedded within the smart case 10, however, allows a consumer-oriented communication device, such as an iPhone, to be configured and used on non-consumer type networks. For example, by switching to a radio embedded within the smart case 10 intended for use by the military, first responders (e.g., police or fire departments), or other tactical radio networks, an ordinary mobile phone or tablet, could be used for communication on these networks.

Figure 6:
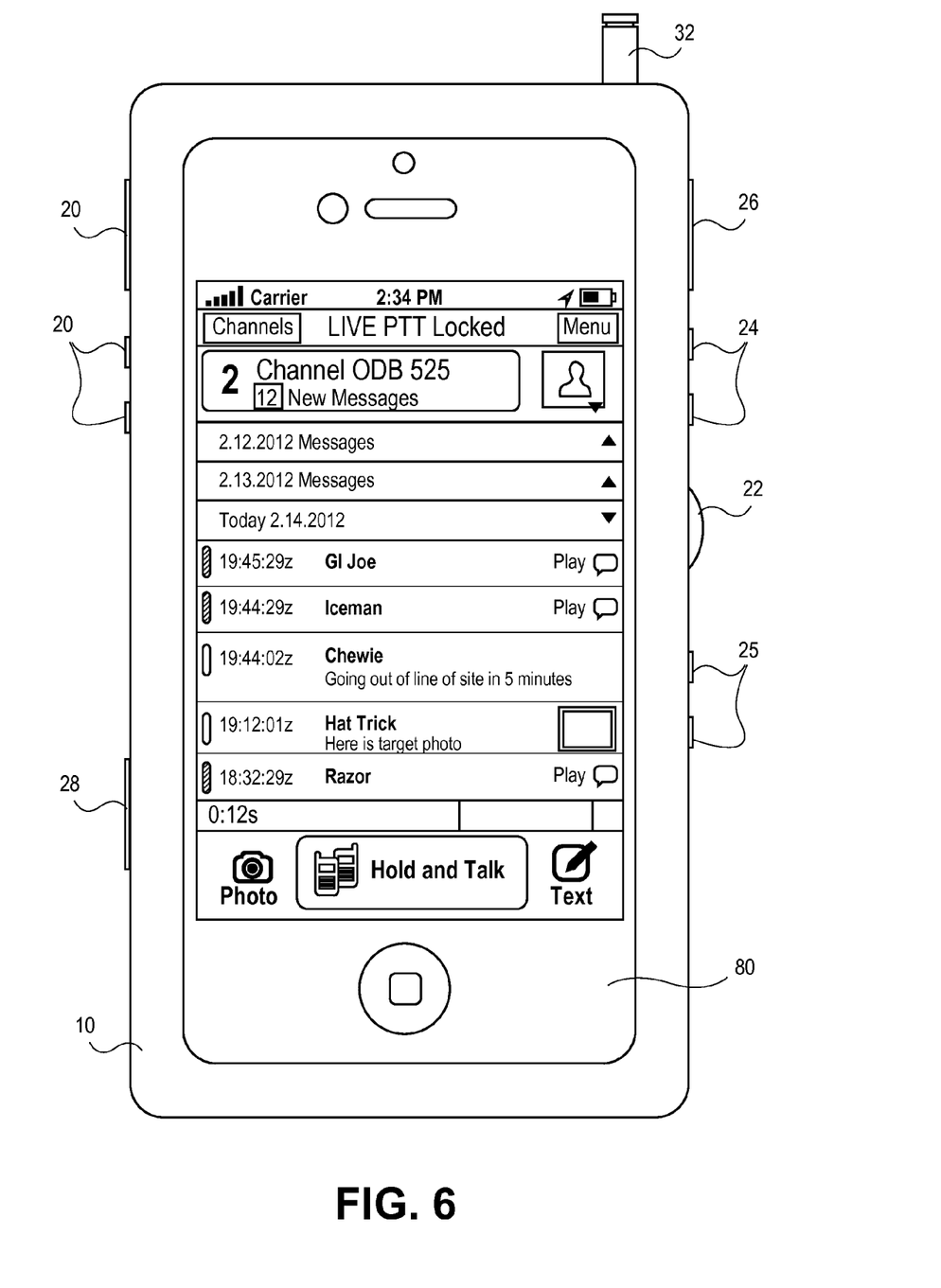
FIG. 6 is a diagram of the smart case used in cooperation with a consumer mobile communication device operating as a tactical communication device in accordance with the principles of the present invention.

Referring to FIG. 6, a diagram of the smart case 10 used with a consumer mobile communication device 80 for operation on a tactical communication network is illustrated. In this embodiment, the communication device 80 is a consumer-oriented communication device, such as mobile phone, cellular phone, or tablet computer, running a tactical radio application. The smart case 10 includes a tactical radio 38. In various embodiments, the tactical radio 38 embedded in the smart case 10 may include, but is not limited to, a satellite radio, a military radio, a police radio, a fire-fighters radio, a first responder radio, any other type of tactical radio, or any combination thereof. By embedding a tactical radio 38 into the case 10, a consumer-orientated communication device, such as an iPhone, iPad, Android phone or tablet, running a tactical PTT application, can be used by tactical, military or first responder personal. In one non-exclusive embodiment, the tactical PTT application is a variation of the Voxer application mentioned above modified for tactical use. The features and functions 22-38 of the smart case 10, as described herein, therefore allow an ordinary "off-the-shelf" consumer smart phone and/or tablet to be used for tactical PTT radio applications, without redesign or modification.

Figure 7:
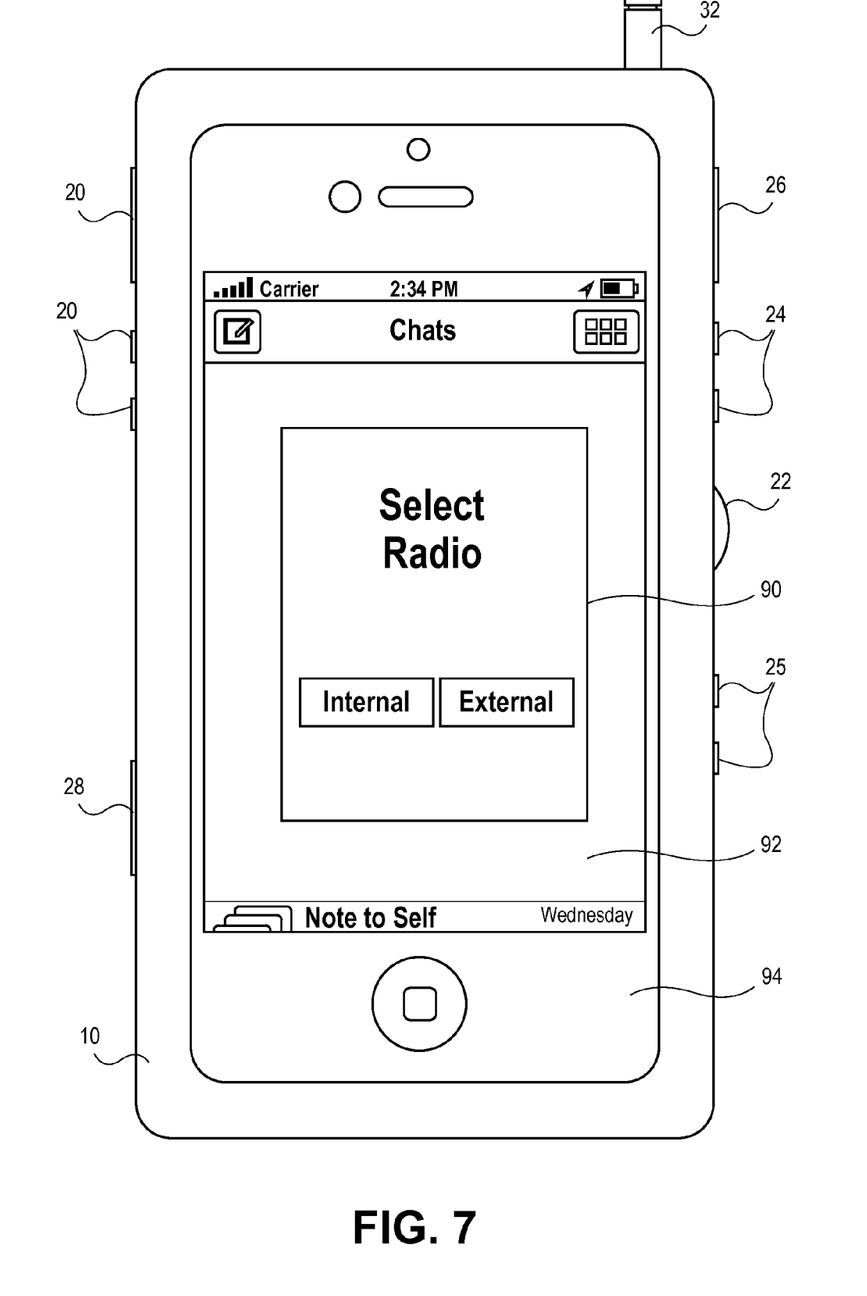
FIG. 7 is a diagram of the smart case used in cooperation with a mobile communication device for implementing a soft switch in accordance with the principles of the present invention.

Referring to FIG. 7, a diagram of the smart case 10 used in cooperation with a mobile communication device for implementing a soft switch in accordance with the principles of the present invention. With this embodiment, a window appears 90 appears on the display screen 92 of a mobile communication device 94. The window 90 presents the user with the options of selecting either the external radio(s) 38 in the smart case 10 or an internal radio contained within the device 94 itself. With this embodiment, the device 94 runs a software application, that operates in cooperation with the smart case 10, for switching between the two radio options.

Figure 8:
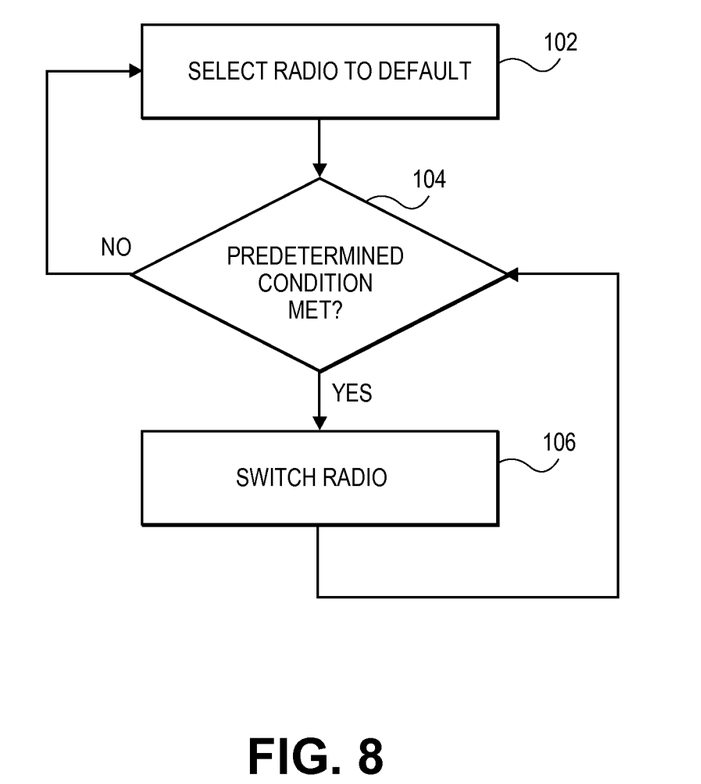
FIG. 8 is a flow diagram illustrating the implementation of a soft switch based on a predetermined condition in accordance with the principles of the present invention.

Referring to FIG. 8, a flow diagram 100 illustrating the implementation of a soft switch based on the occurrence of a predetermined condition is shown. In the initial step 102, the radio is set to the default radio. In various embodiments, the default radio can be either the radio(s) 38 in the smart case 10 or an internal radio within the mobile communication device. In decision step 104, the operation of the communication device 10 is continually monitored to determined if a predetermined condition has been satisfied. If not, the radio used remains the default radio. On the other hand if the predetermined condition is met, then a switch occurs (step 106). For example, if the internal radio is the default radio, then operation switches to the radio(s) 38 in the smart case 10, or vice versa. The aforementioned sequenced is continually performed while the communication device is being used.

It should be noted that in the aforementioned embodiments, either a hard or soft switch is provided to selectively transition between the radio(s) 38 in the smart case and the internal radio(s) within the mobile communication device. In alternative embodiments, no switch is needed and the radio(s) 38 contained within the smart case 10 is/are exclusively used.

In various embodiments, the predetermined condition can be any condition that warrants or would benefit from the switch. For example, if the user of the communication device roams out of the range of the default radio, then the system may automatically switch radios. In a user inserts a SIM card into interface 30, for example while traveling in a foreign country, then a switch automatically occurs to a radio that operates in the foreign country. In yet another embodiment, the predetermined condition can be based on the cost of operation. The selected radio can automatically be selected to the one that costs the least to operate for example. The above provide just a few examples of an automatic soft switch. It should be noted that the current application contemplates switching radios based on any the satisfaction of any predetermined condition or combination of conditions.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and methods and should not be restricted to the ones mentioned above. It is therefore intended that the invention be interpreted to include all variations and equivalents that fall within the true spirit and scope of the invention.

What is claimed is:

1. An apparatus, comprising:
a case including a Push-To-Talk (PTT) function which enables a mobile phone, when encapsulated in the case, to selectively operate as both a PTT communication device over a wireless network using a first radio embedded in the case and as a mobile communication device using a second radio internal to the mobile phone.

2. The apparatus of claim 1, further comprising a switch for switching between the first radio embedded in the case and the second radio internal to the mobile phone.

3. The apparatus of claim 2, wherein the switch is a hard switch embedded in the case.

4. The apparatus of claim 2, wherein the switch is a soft switch that is selectively implemented when the mobile phone is encapsulated in the case.

5. The apparatus of claim 1, wherein the first radio embedded in the case comprises one of the following types of radios:
   (i) a cellular radio;
   (ii) a mobile phone radio;
   (iii) a Wi-Fi radio;
   (iv) a GSM radio;
   (v) a CDMA radio;
   (vi) an LTE radio;
   (vii) a satellite radio;
   (viii) a tactical radio;
   (ix) a military radio;
   (x) a police radio;
   (xi) a fire-fighters radio; and
   (xii) a first responder radio.

6. The apparatus of claim 1, wherein the first radio embedded in the case is a tactical radio that enables the mobile phone to operate on a tactical radio network.

7. The apparatus of claim 6, wherein the tactical radio comprises one of the following:
   (i) a satellite radio;
   (ii) a tactical radio;
   (iii) a military radio;
   (iv) a police radio;
   (v) a fire-fighters radio; and
   (vi) a first responder radio.

8. The apparatus of claim 1, wherein the case is further configured to include one or more input buttons configured to provide input information to the mobile phone when encapsulated in the case.

9. The apparatus of claim 1, wherein the case is further configured to include a scrolling wheel configured to provide input information to the mobile phone when encapsulated in the case.

10. The apparatus of claim 1, wherein the case is further configured to include up/down buttons configured to provide input information to the mobile phone when encapsulated in the case.

11. The apparatus of claim 1, wherein the case is further configured to include a memory card interface to receive a memory card.

12. The apparatus of claim 1, wherein the case is further configured to include a SIM card interface to receive a SIM card.

13. The apparatus of claim 1, wherein the case further comprises a housing for a battery.

14. The apparatus of claim 1, wherein the case further comprises an antenna.

15. The apparatus of claim 1, wherein the case further comprises a camera lens.

16. The apparatus of claim 1, wherein the case further comprises a controller configured to selectively operate the first radio embedded in the case in cooperation with the mobile phone when encapsulated in the case.

17. The apparatus of claim 1, wherein the case further comprises interface circuitry to provide an electronic interface between a controller embedded in the case and a headset jack on the mobile phone.

18. The apparatus of claim 1, wherein the case further comprises interface circuitry to provide an electronic interface between a controller embedded in the case and a dock connector on the mobile phone.

19. The apparatus of claim 1, wherein the case is made of a complaint material.

20. The apparatus of claim 1, wherein the case is made of a protective material so as to provide a protective casing for the mobile phone when encapsulated within the case.

21. The apparatus of claim 1, wherein the second radio internal to the mobile phone is a cellular radio.

22. The apparatus of claim 1, wherein the second radio internal to the mobile phone is a Wi-Fi radio.

23. The apparatus of claim 1, wherein the mobile phone is a smart mobile phone capable of performing one or more of the following:
   (i) running one or more applications;
   (ii) conducting cellular calls; or
   (iii) communicating over a Wi-Fi network.

* * * * *